May 26, 1970 K. H. NORSWORTHY 3,514,585

MULTICHANNEL CORRELATOR SYSTEM

Filed April 4, 1966 7 Sheets-Sheet 1

INVENTOR.
KEITH H. NORSWORTHY

BY Reynolds & Christensen

ATTORNEYS

INVENTOR.
KEITH H. NORSWORTHY
BY
Reynolds & Christensen
ATTORNEYS

May 26, 1970 K. H. NORSWORTHY 3,514,585

MULTICHANNEL CORRELATOR SYSTEM

Filed April 4, 1966 7 Sheets-Sheet 3

INVENTOR.
KEITH H. NORSWORTHY

BY Reynolds & Christensen

ATTORNEYS

INVENTOR.
KEITH H. NORSWORTHY
BY Reynolds & Christensen
ATTORNEYS

May 26, 1970 K. H. NORSWORTHY 3,514,585

MULTICHANNEL CORRELATOR SYSTEM

Filed April 4, 1966 7 Sheets-Sheet 5

INVENTOR.
KEITH H. NORSWORTHY

BY Christensen, Sanborn, & Matthews

ATTORNEYS

INVENTOR.
KEITH H. NORSWORTHY
BY Christensen, Sanborn, & Matthews
ATTORNEYS

May 26, 1970 K. H. NORSWORTHY 3,514,585

MULTICHANNEL CORRELATOR SYSTEM

Filed April 4, 1966 7 Sheets-Sheet 7

INVENTOR.
KEITH H. NORSWORTHY

BY Christensen, Sanborn & Matthews

ATTORNEYS

3,514,585
MULTICHANNEL CORRELATOR SYSTEM

Keith H. Norsworthy, Seattle, Wash., assignor to The Boeing Company, Seattle, Wash., a corporation of Delaware Continuation-in-part of application Ser. No. 256,187, Jan. 17, 1963. This application Apr. 4, 1966, Ser. No. 552,994
Int. Cl. G06f 15/34
U.S. Cl. 235—181 40 Claims

ABSTRACT OF THE DISCLOSURE

A multichannel time correlation computer is disclosed which includes means for efficiently establishing an array of time delay differentials between signal representations to be multiplied in deriving correlation coefficients. The disclosed combinations of circuit features enable the real time presentation of a large number of simultaneous, continuously produced correlation coefficient signals which collectively represent the correlation function, so that it can be observed as it changes with time. The array of time delay differentials enables conservation of multiplier circuitry. Specific improvements are disclosed in arrangements for establishing the time delay differential arrays and for multiplying signal values in analog and digital form.

CROSS-REFERENCE

This application is a continuation-in-part of U.S. patent application Ser. No. 256,187 filed Jan. 17, 1963, now abandoned titled "Multichannel Correlator System."

BACKGROUND AND SUMMARY OF THE INVENTION

This invention relates to systems for computing correlation functions, and more particularly to a multichannel instrument for producing continuous representations of time correlation functions by simultaneously computing time correlation coefficients for a multiplicity of different delay times. It further relates to systems for computation of Fourier transformations and similar functions, thereby prviding the capability of obtaining power spectra and cross power spectra directly from a continuously presented correlation function. In addition, the invention encompasses certain specific improvements in time correlation instruments and the like, including improved techniques and devices for sampling input signals for both high and low frequencies.

In general, correlation studies produce information concerning the relationship between two functions or variables, such as two electrical signals (cross-correlation), or the relationship of a function to itself when displaced or delayed by known amounts (autocorrelation). In electronics, for example, correlation techniques are useful in determining what effect noise produced at a selected point in a system has upon the output of that system, i.e. determining the correlation between output noise and noise produced at an internal point. Correlation studies are by no means restricted to electronics, however. Increasing use is being made of correlation techniques in studying a wide variety of time- and space-varying phenomena, for example in investigating acoustical and meteorological problems, in aerodynamics, radar, space communications, medical research, ocean wave phenomena, seismology and other geophysical studies. Correlation techniques are used to detect common characteristics of signals obscured by presence of uncorrelated noise, and the like, which statistically averages out to zero or a constant when averaged over a sufficient period of time.

While the discussion will hereafter proceed on the basis of time correlation functions only, some of the techniques herein developed are applicable to space correlation studies as well. The well-known formula for the time correlation function of any two time-varying signals $S_1(t)$ and $S_2(t)$ is $$\phi 12^{(\tau)} = \underset{T\to\infty}{\text{Limit}} \frac{1}{2T} \int_{-T}^{T} S_1(t) S_2(t+\tau) dt \quad (1)$$

where $\tau$ is a time delay parameter, i.e. a selected amount of time delay occurring after the time instant $t$. Thus the time correlation function is a function of time delay parameter $\tau$ and corresponds to the long term average of the product of two time signals $S_1(t)$ and $S_2(t)$ multiplied together after a time delay $\tau$ has been applied to one. The valve of this function for any particular value of $\tau$ is termed the "correlation coefficient." Such a function is useful because it contains information on the amount of signal which is common to both $S_1(t)$ and $S_2(t)$. If signals $S_1(t)$ and $S_2(t)$ are completed unrelated (in the time domain) the correlation function will be zero for all values of $\tau$; but if they are related by common frequency components the time correlation function will be dependent on a composite of the correlation components. In such applications the function is referred to as a "cross-correlation" function.

"Autocorrelation" is a special case of the above, where signals $S_1(t)$ and $S_2(t)$ are identical, that is where the signal is delayed with respect to itself by amount $\tau$:

$$\phi 11^{(\tau)} = \underset{T\to\infty}{\text{Limit}} \frac{1}{2T} \int_{-T}^{T} S_1(t) S_1(t+\tau) dt \quad (2)$$

Autocorrelation is useful in indicating how the value of signals $S_1(t)$ at some time $(t+\tau)$ is related to its value at time $t$. This is useful in statistical problems and may be shown to contain essentially the same information about the signal as the (frequency) power spectrum (i.e. a plot of power spectral density versus frequency).

Instruments have heretofore been constructed for computing time correlation functions, operating on the principle of implementing the above formulae. That is, they have included means for delaying one input signal with respect to another, multiplying the signals together, and averaging the product over a period of time. Such instruments are of two general classes: the continuous input type and the sampling type. In the former type of instrument the means for establishing delay between continuous input signals usually comprises means for recording or storing one signal on a magnetic tape or drum and repeating the same back after a selected length of time of transit between recording and pickup heads. Acoustical delay devices have also been used in such instruments. While this type of instrument has advantages for some applications, it involves high costs attending complicated recording and pickup devices and necessary compensations because of distortions due to frequency response characteristics of magnetic tape recorders or other delay instruments used, and for other reasons.

Correlator instruments of the sampling type generally implement the following statistical forms of the above integration formulae for the cross-correlation and autocorrelation functions, respectively:

$$\phi 12^{(\tau)} = \underset{K\to\infty}{\text{Limit}} \frac{1}{2K} \sum_{k=-K}^{k=K} S_1(t_k) S_2(t_k+\tau) \quad (3)$$

$$\phi 11^{(\tau)} = \underset{K\to\infty}{\text{Limit}} \frac{1}{2K} \sum_{k=-K}^{k=K} S_1(t_k) S_1(t_k+\tau) \quad (4)$$

where $S_1(t_k)$ and $S_2(t_k+\tau)$ are signal samples taken at times $t_k$ and $t_k \div \tau$.

While these formulae define the time correlation function, the correlation coefficient defined above represents their solution for a selected amount of delay $\tau$. Previous correlation instruments, whether of one type or the other, have been primarily instruments for computing and recording correlation coefficients one at a time for different increasing or decreasing amounts of delay, thereby constructing the correlation function from a series of discrete solutions thereof. This represented a cumbersome and time-consuming procedure due to the necessity for operation of the instrument through a complete cycle for each value of delay time selected. The procedure became burdensomely slow when long delay times $\tau$ were required. In an attempt to overcome this last-mentioned disadvantage a multichannel instrument was proposed wherein a group of correlation coefficients representing one set of delay times $\tau$ was computed during one cycle of operation, then another group corresponding to a different set of delay times during a succeeding cycle, and so on until the correlation function was constructed fragmentally. However, the very necessity for changing the settings of delay times in the instrument between operating cycles imposed operating delays and inconvenience. Moreover, by the nature of such a method the different groups of correlation coefficients were not taken from the identical excursion of signal, and thereby precluded accurate analysis of nonrepeating or random variables which changed during the computation procedure. A purpose of the present invention is to provide a system avoiding these disadvantages.

Other disadvantages and limitations of such prior art systems overcome by the present invention include a certain lack of flexibility occasioned by restrictions imposed on the selection of delay times used for each group of computations, inability to handle either vary high or very low frequency input signal components, and inaccuracies in the sampling techniques employed. Of greatest importance, however, is the fact that none of these prior instruments was capable of generating a continuous analog representation of a time-correlation function in its entirety, nor of generating the same concurrently with incidence of input signals, whether for utilization or for immediate continuous display and observation.

Correlation techniques are closely related to power spectrum studies both practically and mathematically, giving some of the same information about variables or signals. It is well known that the power spectrum $P(\omega)$ of a single function or signal is the Fourier transform of its auto-correlation function, according to the following formula:

$$P(\omega)=\frac{1}{2\pi}\int_{-\infty}^{\infty} e_{\phi 11}^{-j\omega\tau}(\tau)\,d\tau \qquad (5)$$

Similarly, the cross-power spectrum $C(\omega)$ of two signals whose cross-correlation function is $\phi_{12}(\tau)$, is:

$$C(\omega)=\frac{1}{2\pi}\int_{-\infty}^{\infty} e_{\phi 12}^{-j\omega\tau}(\tau)\,d\tau \qquad (6)$$

One method for obtaining power spectra or cross-power spectra has been to compute the Fourier transform of a previously obtained correlation function by digital computing techniques, or the like, involving rather extensive and time-consuming treatment of information. Other well-known means exist for obtaining power spectra and cross-power spectra independently of correlation functions, namely spectral analyzers and the like.

However, no previous instrument was economically suitable for simultaneously computing the correlation function for a sufficiently large number of time delays $\tau$ to permit instantaneous and continuous determination of the entire power spectrum or cross-power spectrum of signals or for generating these spectra without necessity for separately computing a succession of Fourier transforms. This invention provides an instrument adapted for use in systems having this capability.

Accordingly, it is a further and primary object of this invention to provide an instrument for substantially simultaneously computing correlation coefficients for a multiplicity of different delay times, thereby continuously generating substantially the complete correlation function, to thereby make the instrument well suited for use in a system for the coincident and continuous generation or computation of the corresponding (frequency) power spectrum based on the computed correlation function.

Another important object hereof is to provide in such an instrument the capability of computing a large number of correlation coefficients, with minimum apparatus requirements, thus permitting achievement of economical compact and easily maintained systems for generating continuous representations of correlation functions.

A further object is to provide an instrument capable of computing correlation functions for time delays ranging from negative to positive values.

Another object hereof is to provide a time correlation computer in which, by appropriate selection of values of delay time $\tau$, the computations may be centered about any selected portion of a correlation curve. A related object is to provide such an instrument, which permits varying the extent of the range over which a correlation function may be computed.

A further object is to provide such an instrument which is adaptable to permit computing simultaneously therein the respective correlation functions of different pairs of input signals.

An additional highly important object is to provide a time correlation instrument with means permitting sampling a signal or signals at high sampling rates, with computation delay times $\tau$ as long as may be desired, and capable of handling a range of input signal frequencies as broad as may be desired.

A related object hereof is to provide in one embodiment of the invention a multichannel instrument capable of handling much higher input signal frequencies, and in another embodiment much lower input signal frequencies, than was possible heretofore in a time correlation computer.

A further object of the present invention is to provide a multichannel instrument which makes use of digital components such as binary shift registers.

An additional object of the present invention is to provide an improved multichannel correlator making use of digital components and wherein the product rate is readily increased for those applications wherein $\Delta\tau$ is fixed by application requirements.

A further object of the present invention is to provide improved multiplication circuits for receiving a pair of multi-bit binary signals and providing an analog output signal which is proportional to the product of the two binary input signals.

Another object of the present invention is to provide a multichannel correlator system using digital techniques which are readily implemented through the use of multichannel shift registers, magnetic core storage units, or a magnetic drum for producing Cartesian product patterns of delays.

Still another object of the invention is to provide improved electronic time correlation instrument circuit arrangements which are well suited to transistorization and miniaturization.

The invention is herein discussed primarily in terms of its application to sampling type correlators, but it should be understood that most of its features also apply to continuous input type correlators. The necessary correspondence between the sampling type correlator and continuous input type correlator will be obvious to those skilled in the art.

To achieve the above and related objects a system according to this invention intermittently samples each input signal a selected number of times, delays the set of samples of one signal by predetermined amounts with relation to those of the other signal, and applies both the delayed and undelayed samples to multiplying means adapted to produce the Cartesian product thereof in terms of circuit values (i.e. voltages or currents). The "Cartesian" product of the two sets of signal samples as thus derived is herein defined as the total set of products of all samples in one set multiplied individually by all samples of the other set. The multiplying means thus produces a plurality of output products equal in number to the product of the numbers of samples in the respective sets. Because these individual output products correspond effectively to different predetermined amounts of time delay $\tau$, it will be evident that a large number and range of delay times may be achieved in short order by the described combination of sampling and multiplying means. Computation of the time correlation function of the two signals is completed by time averaging each of the Cartesian product circuit values (which may vary with time) as the intermittent sampling and "Cartesian" multiplying operations are cyclically repeated in operation of the system. The output from the time averaging means comprises a set of voltages or currents each representing the correlation coefficient for a different value of delay time $\tau$, and which thereby collectively represent the time correlation function of the two signals at any instant during system operation. Such output may be suitably indicated, recorded or otherwise utilized as now to be discussed.

The availability of the complete correlation function "live" in the form of continuous output voltages or currents representative of the correlation coefficients makes possible the simultaneous computation of power spectra. For this purpose such voltages or currents can be individually fed as inputs to a power spectrum generator.

Additional features of the invention reside in certain disclosed means for sampling input signals and for delaying and pairing for multiplication the samples thus obtained, such means being suited especially for signals comprising high frequency components. This portion of the system in its preferred form employs two sets of sampling gates of improved construction, one set for each input signal. In response to timing control means the gates in one set are individually actuated to sample one input signal at successively delayed points of time during each operating cycle. Following such sampling of one signal the individual gates in the other set are successively actuated to sample the other signal. The individual samples from the second signal are respectively paired with and multiplied by the immediately preceding samples from the first signal, thereby to produce a plurality of products, respectively corresponding to different delay times $\tau$, equal in number to the product of the numbers of gates in the respective sets. As the gating and multiplying cycles are repeated the cyclically produced products are individually time-averaged to produce continuously a multiplicity of output currents or voltages representative of computed correlation coefficients and which collectively represent the correlation function.

This unique sampling and multiplying arrangement, which is achievable with minimum circuitry, constitutes one of the chief features of the computer system offering increasing advantage the higher the required number of correlation coefficients. In this regard, it will be observed that the required number of sampling gates (and related circuitry) is only a fraction of the number of different time delays $\tau$ computed, since the latter number as already mentioned is equal to the product of the respective numbers of sampling gates in the two sets. Thus if forty-eight different time delays $\tau$ are required, they can be obtained according to this invention with only sixteen sampling gates, for example, four in one set and twelve in the other, whereas prior systems would have required forty-nine channels to produce the same number.

In a second embodiment, sampling and delaying means especially adapted for input signals having relatively low frequency components comprises means for sampling each input signal at least once during each system cycle, and a plurality of means for storing the individual samples over time periods spanning at least several cycles. Selection means pair these samples, one sample of each signal in each pair, in the different possible combinations for multiplication. The members of each pair are of different ages, having been stored for different lengths of time, and the relative ages vary from pair to pair to establish a suitable array of time delays $\tau$ as in the embodiment previously described. A maximum number of such pairs are simultaneously presented to the multiplying means, the number being determined by the number of different time delays $\tau$ obtainable from the available number of stored samples. An additional increment of delay is added to each of the stored samples each cycle at the same time that a multiplication takes place. This embodiment thus differs from the first in the fact that the different computation delays $\tau$ are estabished from two bases of time diversity, namely original derivation of the samples at different times, and repeated seelction of the same stored samples after different periods of storage for use in different sample pairs. It also differs from the first embodiment in the fact that the sampling and delaying operation spans several cycles while multiplication takes place once each cycle. Longer delay times may therefore be obtained, thus extending the lower end of the useful signal frequency spectrum of the system. An important advantage of such an arrangement is increased low-frequency capability without necessity for greatly increasing the time constants of the averaging circuits in the correlation coefficient output channels.

The inventive concepts are further embodied in a system utilizing digital components for obtaining the advantages noted above. In this embodiment the two input signals are first applied to analog-to-digital converters for periodic sampling and conversion to digital information. The digitizing rate of the first converter for one signal is fixed by the frequency of a clock pulse generator, while the digitizing rate of the other is set at a frequency of $f/N$ where N is equal to the number of words or stages in a shift register coupled with the output of the first converter. The output of the second converter is applied to an M stage shift register having a shift rate of $f/N$. On each "$N^{th}$" clock pulse the contents of the N stage shift register are transferred to an N stage temporary storage unit. The contents of the temporary storage unit are then matched with the various stages of the M stage register and applied to a plurality of multiplying circuits disposed intermediate the temporary storage unit and the output averaging circuits. The system includes improved multiplying circuit arrangements providing pulse width—pulse height modulation, binary weighting of a width modulated pulse, and digital combination of paired bits words from two with the resulting signals being added by binary weighted summing resistors.

In some applications wherein systems of the type provided by the present invention are utilized the increment of time delays between correlation coefficients is fixed and yet it would be desirable to increase the product rate to a value higher than that normally obtainable in a system producing an $M \times N$ delay pattern, even with N equal to unity. Thus there is provided in one embodiment of the present invention a system which makes use of a single stage "N" shift register and a $k$M stage "M" shift register. every $k$th stage of the "M" shift register has its output circuits paired with adjacent or intermittent output circuits of the "N" shift register. The clock pulse frequency which controls the sample rate and shift rate of the "M" and "N" registers is then increased by a factor of $k$ times the frequency $f$ which would be used in an $M \times N$ delay pattern correlator operating on the same fixed increment of time delays between correlation coefficient. The results is that the product rate is increased with $\Delta\tau$ being held fixed in accordance with application requirements.

The invention also includes means for varying the timing control frequency so that increments between successive time delays ($\tau$) may be uniformly and simultaneously increased or decreased. In addition, the system includes variable delay means operative upon the sampling and delay means to permit changing the relative time delays between the two sets of samples taken from signals $S_1(t)$ and $S_2(t)$, respectively. These two capabilities permit concentration of points on the correlation function in selected regions of special interest (i.e. when the function undergoes changes requiring close definition), or spreading out the points over regions of a less critical nature adequately defined with fewer points.

These and other objects and advantages of the invention will be better understood from the following description when read with reference to the accompanying drawings.

DESCRIPTION OF THE PREFERRED EMBODIMENTS

Figures 1, 2:
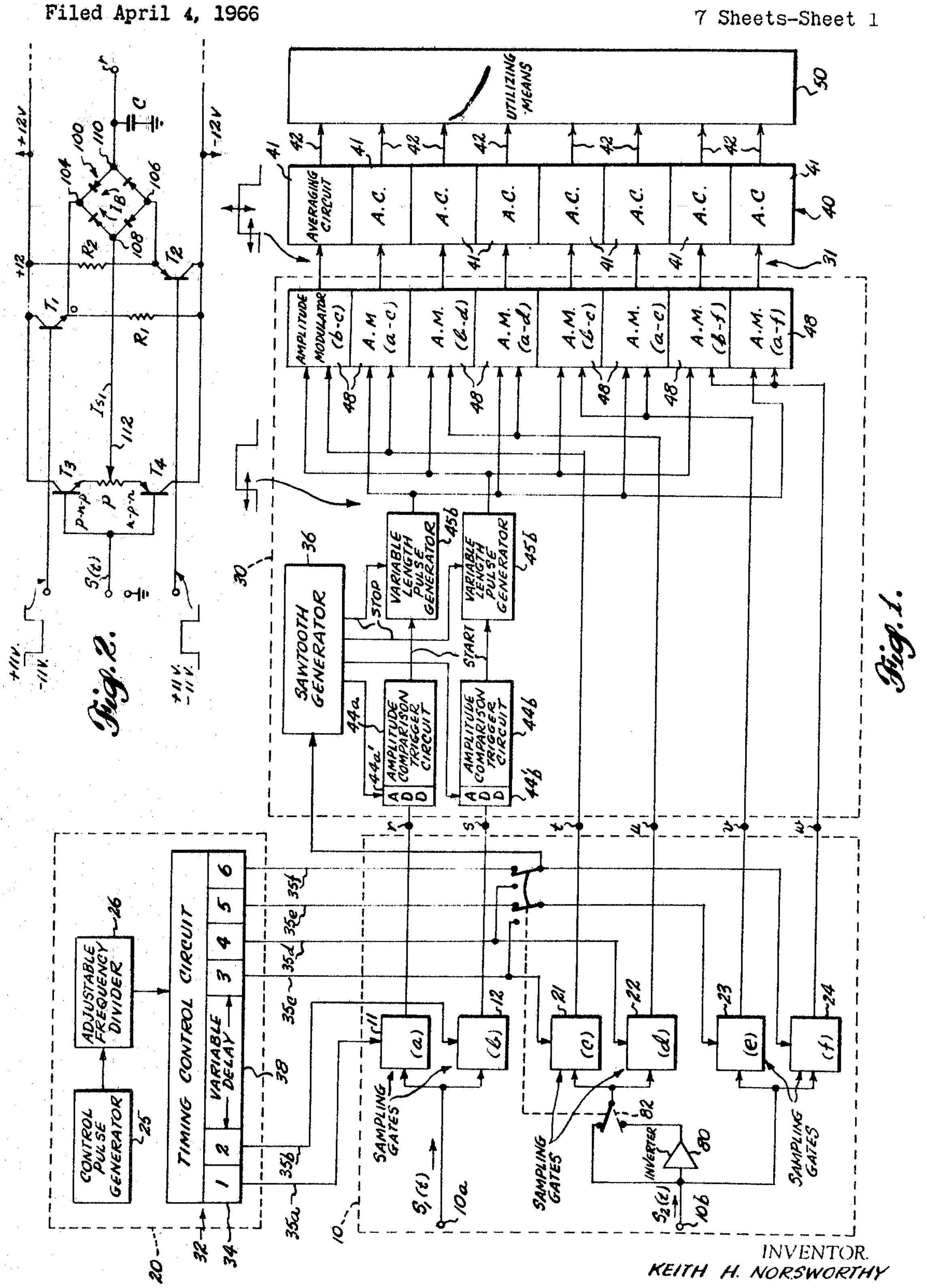
FIG. 1 is a block diagram of the improved system for computing correlation functions.
FIG. 2 is a schematic diagram of a preferred sampling gate, FIGS. 3*a*, 3*b* and 3*c* constitute a timing diagram illustrating the operating theory of the system.

The system illustrated in FIG. 1 includes a sampling means 10 having inputs 10*a* and 10*b* to which the respective signals $S_1(t)$ and $S_2(t)$ are applied. In the case of cross correlation these are different signals, whereas they are the same signal $S_1(t)$ in the case of auto-correlation. Sampling means 10 controlled by a timer 20 samples each input signal at timed intervals. The timing is such that a succession of samples of signal $S_2(t)$ are taken following a sucession of samples of signal $S_1(t)$. This alternate sampling of the two signals is repeated cyclically under control of timer 20.

Multiplying means 30 controlled by timer 20 has a series of inputs *r, s, t, u,* etc. to which the respective samples are fed (as voltages or currents). The multiplier 30 includes pulse-width, pulse-height modulation means to produce at its outputs 31 a plurality of separate signals each representative of a product of two samples, one of each input signal. These output signals correspond to different values of computation time delay. During recurrent cycles of operation these output product signals (pulses) vary in magnitude with variation in magnitudes of samples of the input signals. Conversion of these product signals into continuous voltages or currents is accomplished by individual averaging circuits 41. The output of each averaging circuit 41 is a continuous analog representation of one correlation coefficient of input signals $S_1(t)$ and $S_2(t)$ for a particular delay time $\tau$. The collective averaging circuit outputs 42 carry a continuous analog representation of the complete correlation function.

The utilization means 50 is responsive to all the averaging circuit outputs 42 and can be display or recording apparatus for the correlation function, or when used for computing power spectra the utilization means 50 comprises means to continuously transform the computed correlation function information into power spectrum information.

Referring now to the timing control system 20, basic time intervals are established by a control pulse generator 25, which may constitute any suitable oscillator of high stability. A crystal-controlled blocking oscillator operating at one megacycle per second is suitable. The basic control pulses from generator 25 are fed into a timing control selector 26, preferably comprising a binary-base frequency divider. Timing control intervals established by selector 26 may be adjusted or varied by factor increments of two, such as from one microsecond to two microseconds, four microseconds . . . 1,024 microseconds. The resultant control pulses of selectively reduced frequency are then fed into a master timing control circuit 32 whereby they are distributed to various parts of the correlator system.

Timing control circuit 32, preferably comprising binary-base digital components, includes a series of switching circuits 34 (individually numbered 1 through 6) for controlling the respective sampling gates 11, 12, 21, 22, 23 and 24 through connections 35*a*, 35*b* . . . 35*f*. The switching circuits 34 preferably comprises D-C controlled bistable (scale-of-two) switching circuits or "flip-flops" of any suitable or known type. When triggered recurringly each produces two square waves of opposite phasing. The function of the variable delay means 38 in the timing control circuit will be explained hereinafter.

In the sampling means 10, signal $S_1(t)$ is continuously applied to the inputs of gates 11 and 12 and $S_2(t)$ similarly to the inputs of gates 21, 22, 23 and 24. As will appear, the timing of gate actuation for momentary signal sampling normally takes place in the following order: Gate 11 followed by gates 12 and 21 actuated simultaneously, thence followed successively by gates 22, 23 and 24. The total cycle is repeated recurringly by the timer 20. In this embodiment (best suited for high frequency signal applications) these gates preferably are of the "sample and hold" type, each retaining its sample voltage or current for subsequent use by multiplier 30. Such a gate circuit, illustrated in FIG. 2, consists mainly of a diode bridge 100 switched alternately to "on" and "off" states by voltage waves from timer 20 applied through control transistors $T_1$ and $T_2$. The collectors of these transistors are connected to DC voltage sources (not shown) typically of +12 and −12 volts and their emitters are connected directly to bridge terminals 104 and 106, respectively. Their emitters are also connected through resistances $R_1$ and $R_2$ to the DC voltages sources of −12 and +12 volts, respectively. The base voltage of each control transistor controls its emitter voltage, and therefore the bias voltage applied to the bridge. When the timing control voltage applied to the bases of the control transistors $T_1$ and $T_2$ are −11 volts and +11 volts, respectively, the bridge is switched "on," whereas a reversal of these voltages switches it "off." A double transistor emitter-follower circuit comprising transistors $T_3$ and $T_4$ accepts the input signal $S(t)$ and ensures low drive impedance to the bridge input terminal 108.

With the bridge switched "on" terminal 104 is at approximately −11 volts, while terminal 106 is at approximately +11 volts. Under these conditions the bridge diodes are conductive and a potential established by signal $S(t)$ at bridge input terminal 108 is also sought by the output terminal 110 because of the balanced form of the bridge, together with the fact that transistors $T_1$ and $T_2$ constitute variable impedances viewed at their emitters. Storage condenser C connected between terminal 110 and ground thereby acquires a corresponding charge voltage due to flow of bridge current $I_B$ under control of the emitter-follower driving stage. With the bridge switched "off," condenser charge is retained owing to the fact that bridge terminal 104 is now rendered positive while terminal 106 is made negative. Flow of current $I_B$ between terminals 104 and 106 is now cut off. Because of its double-end form, the gate circuit is capable of following both positive and negative signal excursions. Moreover, because the time period from "on" to "off" condition can be made extremely short, and because the capacitor voltage does not have change in this time period, very high-frequency signals S($t$) can be sampled accurately to represent the value of the input signal at any instant.

Figure 3A:
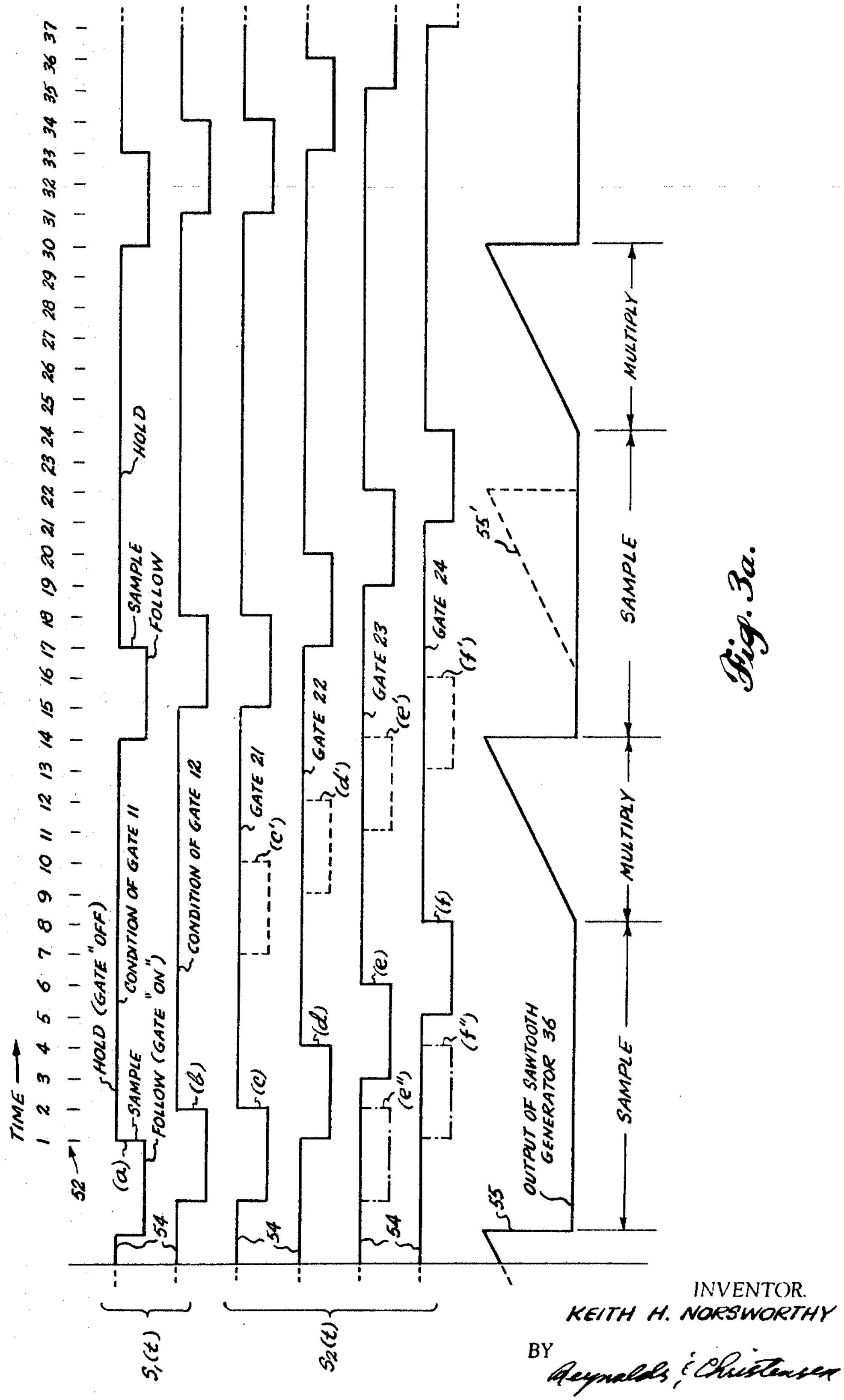
Figures 3B, 3C:
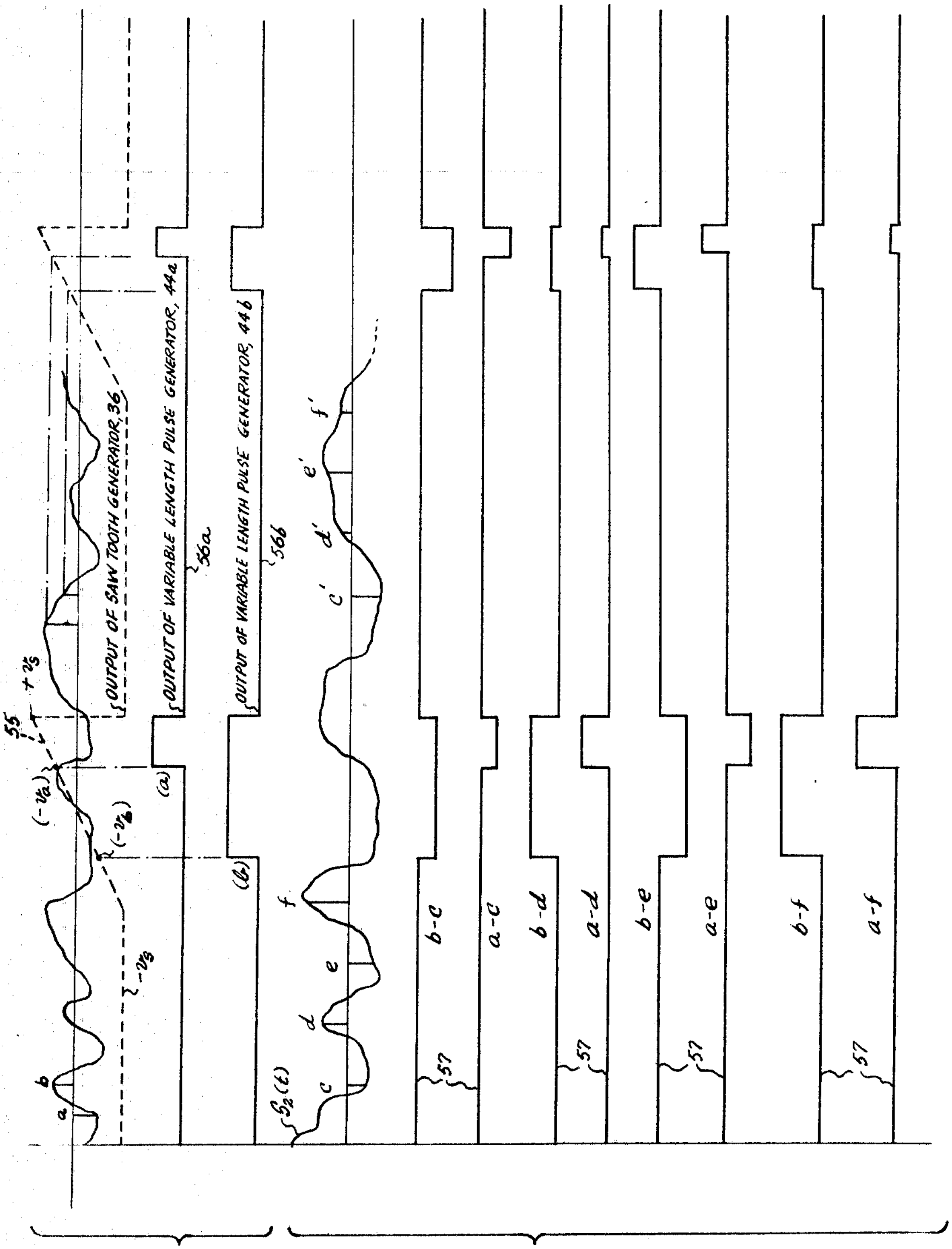

Before describing the multiplier 30 more specifically an explanation of over-all system operating theory is in order. The timing diagram of FIGS. 3*a*, 3*b* and 3*c* illustrates two complete cycles of operation. In each part of the diagram both the sampling phase and the multiplying phase are shown. In FIG. 3*a* wave-forms 54 depict the "on" and "off" conditions of the sampling gates. The consecutively numbered time markers 52 represent the output pulses from timing control selector 26 (FIG. 1) applied to the timing control circuit 32. As previously stated, their interval may be increased or decreased at will by adjustment of the frequency division ratio of selector 26.

The sampling phase begins when the first gate 11 is switched "on." Capacitor C rapidly charges to a voltage corresponding to instantaneous input signal voltage and thereafter follows the latter for the duration of time the gate is on. In the example this "follow" time is three time units 52. When the gate 11 is switched "off," the condenser voltage of that instant represents the desired sample of the signal, and is held during the remainder of the cycle, extending through the multiplying phase. It is held until the gate is again switched "on" for re-sampling the signal. All the sampling gates operate in this way beginning at different times during the cycle.

As shown in FIG. 3*a*, gate 11 takes its sample of input signals $S_1(t)$ at point of time 1, and gate 12 takes its sample at point 2. Gates 21, 22, 23 and 24 sample signal $S_2(t)$ sequentially beginning with operation of gate 21. This may begin, as illustrated, at the same time (point 2) as sampling by gate 12. The samples taken by gates 11, 12, 21, 22, 23 and 24 are respectively designated *a, b, c, d, e,* and *f*. It will be observed that the time delays which exist between either of the samples *a* or *b* and different individual samples *c, d, e* and *f* can be arranged in a linear succession, as follows:

TABLE I

| Sample pairs: | Time delay $\tau$ between samples (in units) |
|---|---|
| *b–c* | 0 |
| *a–c* | 1 |
| *b–d* | 2 |
| *a–d* | 3 |
| *b–e* | 4 |
| *a–e* | 5 |
| *b–f* | 6 |
| *a–f* | 7 |

This result is obtained in general terms by timing the successive samplings of signals $S_2(t)$ to occur at intervals equal to the product of the interval(s) between samplings of $S_1(t)$ multiplied by the number of samples of $S_1(t)$ taken during one cycle. In this case where two samples of $S_1(t)$ are taken in each cycle, the time between them being one time unit, the intervals between samples of $S_2(t)$ are established at two time units. Moreover, the number of time delays $\tau$ thus established is equal to the product of the numbers of sampling gates for the respective input signals, requiring in this case only six sampling gates to obtain eight different time delays.

After taking the last sample *f*, the multiplying portion of the cycle begins. The function of multiplying is to produce a number of output voltages each of which is the product of two different signal samples (from $S_1(t)$ and $S_2(t)$) which are cross-correlated for a particular time delay. In the example, eight such output voltages are provided, corresponding to the eight time delays. Referring to FIG. 1, the multiplying means 30 comprises a triggered saw-tooth generator 36 responsively connected through lead **35*f* to the last stage (6) of time circuit 32, 34** to be triggered into operation at the instant the last sample *f* is taken by gate 24. The saw-tooth output waveform 55 appearing in FIGS. 3*a* and 3*b* passes from a negative voltage $-v_s$ to a positive peak voltage $+v_s$, this signal excursion exceeding negative-to-positive excursions of input signal voltage $S_1(t)$. It is applied to one input of each of two amplitude comparison trigger circuits **44*a* and 44*b* which include input addition stages 44*a'* and 44*b'*, respectively. Circuit 44*a* has a second input ($r$) to which the sample voltage from gate 11 is applied, and circuit 44*b* has a second input(s) to which the sample voltage from gate 12** is applied. Each of these trigger circuits adds its two inputs in the addition stage, compares this sum to a reference voltage which in this case is zero, and produces an output trigger pulse when the input voltage sum becomes equal to that reference voltage. In the case illustrated in FIG. 3*b* sample *a* (gate 11 output) is negative and sample *b* (gate 12 output) is positive. Trigger circuit **44*b* thus produces an output pulse when the saw-tooth output 55** reaches a value equal to the negative of the sample *b* voltage ($-v_b$), and trigger circuit **44*a*** produces an output pulse later in time when the saw-tooth wave-form reaches a value equal to the negative of the sample *a* voltage ($-v_a$).

Two variable-length pulse generators **45*a* and 45*b* (FIG. 1) are respectively connected to be initiated by these output trigger pulses from trigger circuits 44*a* and 44*b*. These generators produce pulses 56*a* and 56*b*** (FIG. 3*b*), respectively, of constant heights and of lengths determined by times at which they are triggered by the respective comparison circuits. Both generator circuits **45*a* and 45*b* are also connected to the saw-tooth generator 36 to be triggered off by termination of the saw-tooth. The variable-length pulses from generators 45*a* and 45*b*** therefore begin at varying intervals after the instant the last sample *f* is taken depending upon the magnitudes of the respective samples from gates 11 and 12, and terminate at a constant interval after sample *f* is taken, because the saw-tooth wave is of fixed duration. Thus in the variable length pulse generator outputs **56*a* and 56*b*** variations are seen from one cycle to the next, successive pulses varying in length in linear proportion to successive sample values of signal $S_1(t)$ according to the following formula:

$$\text{Pulse length} = L + A_1 S_1(t_k) \quad (7)$$

where L and $A_1$ are constants. The saw-tooth, coincidence and variable-length pulse generative circuits may be of any suitable or well-known form so as to require no detailed description herein.

The multiplying means 30 further includes amplitude modulators 48, corresponding in number to the number of available time delays $\tau$ (see Table I), each having two input terminals, one connected to a variable-length pulse generator **45*a* or 45*b*** and the other to one of the $S_2(t)$ gate circuit output terminals *t, u, v* or *w*. The function of each amplitude modulator circuit 48 is to modulate the constant-magnitude pulse received from one of the variable-length pulse generators (**45*a* or 45*b***) in linear proportion to the magnitude of one of the samples of signal $S_2(t)$ according to the following formula:

$$\text{Pulse height} = A_2 S_2(t_k + \tau) \quad (8)$$

where $A_2$ is a constant. Thus the magnitude-time "areas" of the resultant output pulses are given as follows:

$$\text{Pulse area} = A_1 A_2 S_1(t_k) S_2(t_k + \tau) + L A_2 S_3(t_k + \tau) \quad (9)$$

Equation 9 contains a first term which corresponds to the products of the respective pairs of original signal samples, and a second term proportional to sample values of $S_2(t)$. When averaged over many cycles this second term reduces to zero or a constant.

In FIG. 3*c* the set of output pulses 57 (respectively designated *b–c, a–c, b–d,* etc., according to the signal sample products represented) from the multiplying modulators 48 is depicted during two operating cycles of the system. It will be noted that some of these output pulses are positive and some negative, that each may change from one polarity to another and that their magnitude-duration characteristics are subject to variation, all in accordance with the multiplied values of the paired signal samples. It will also be seen that because of the assigned time delays in the order of sampling signals $S_1(t)$ and $S_2(t)$ each of the pulses 57 corresponds to a product $S_1(t_k)S_2(t_k+\tau)$ for a different time delay $\tau$. Each such product formed for the same time delay $\tau$ during each operating cycle ultimately contributes to the corresponding correlation coefficient as time $t_k$ increases progressively. (In practice the voltage between pulses need not be zero as indicated in FIG. 3*b*. The use of a non-zero reference voltage would add a constant (independent of $\tau$) to the correlator output.)

To produce the respective correlation coefficients each series of combined variable-length, variable-magnitude, variable-polarity modulator output pulses 57 appearing at outputs 31 is next resolved into an output voltage, current or other measurement quantity such as a delay interval, a digital representation, etc. In the preferred embodiment the product information carried by pulses 57 is converted directly by averaging means 40 into a continuous, variable voltage or current in a process which suitably performs the time integration operation in the cross-correlation formula (Equation 1). The individual outputs 31 are applied to separate averaging circuits 41, each preferably consisting of a simple RC filter having a time constant many times longer than the length of a cycle of operation of the system. Thus, a cross-correlation coefficient $\phi(\tau_n)$ is produced as each series of pulses 57 for a different time delay $\tau_n$ is averaged individually during system operation. Over a period of operating cycles, with time $t_k$ increasing progressively, variations in the average of a series of pulses 57 represent variations in the individual cross-correlation coefficient thus computed. Consequently, the correlation function $\phi(\tau)$ itself, comprising the collective correlation coefficient outputs, may change in shape and magnitude with time because of time variations in individual correlation coefficients.

Referring to the correlation function formula (Equation 1), the operation of the system is now seen to be complete. The averaging circuits 41 perform the integration and division, collectively producing at outputs 42 the correlation function $\phi(\tau)$, made up of eight uniformly distributed correlation coefficients $\phi(\tau_n)$ produced in analog form continuously during system operation. These may be displayed directly on an oscilloscope or recording apparatus (not shown), or may be otherwise employed in utilization means 50 as later described.

It was previously indicated that the timing control selector 26 permits varying the length of the basic operational time intervals 52, and thereby the intervals between signal samples, and in fact the length of the entire system operating cycle. Thus the spread between successive delays $\tau$ by which the cross-correlation function is represented may be varied at will. In addition, the timing control apparatus 20 also includes means permitting production of the correlation function of the signals in regions displaced from zero. For this purpose a variable delay means 38 of any suitable or well-known form is provided in the timer circuit interposed between switching circuits 2 and 3. Depending upon the setting of this delay means 38, the samplings of signal $S_2(t)$ may be delayed by any desired amount from the samplings of signal $S_2(t)$. This is illustrated in FIG. 3*a* wherein the dotted-line pulses of sampling gates 21 through 24 are shown uniformly delayed in order to establish uniformly delayed sampling times *c'*, *d'*, *e'*, and *f'*. A delay of 8 time units, for example, results in time delays as shown by the following table (compare with Table I):

TABLE II

| Sample pairs: | Time delay $\tau$ between samples (in units) |
|---|---|
| *b–c'* | 8 |
| *a–c'* | 9 |
| *b–d'* | 10 |
| *a–d'* | 11 |
| *b–e'* | 12 |
| *a–e'* | 13 |
| *b–f'* | 14 |
| *a–f'* | 15 |

Because saw-tooth generator 36 is triggered by the last switching circuit 34, any change in the setting of time delay means 38 produces an appropriate shift in the starting time for the saw-tooth pulse, as shown by dotted line 55'. Thus the multiplying phase of the cycle is always made to follow the sampling phase. (If desired the saw-tooth generator 36 may have an adjustable saw-tooth slope control in order to permit varying the length of the multiplying phase of the cycle to compensate for changes in gain due to control frequency or time delay changes.) While this variable delay capability permits real time display (or other utilization) of the correlation function in any region thereon including or removed from zero delay, the frequency selection capability permits expanding or contracting that region in order to vary the degree of definition of the cross-correlation function with the available number of delay values $\tau$. Further advantages of the variable delay capability will be discussed hereinafter.

Figure 4:
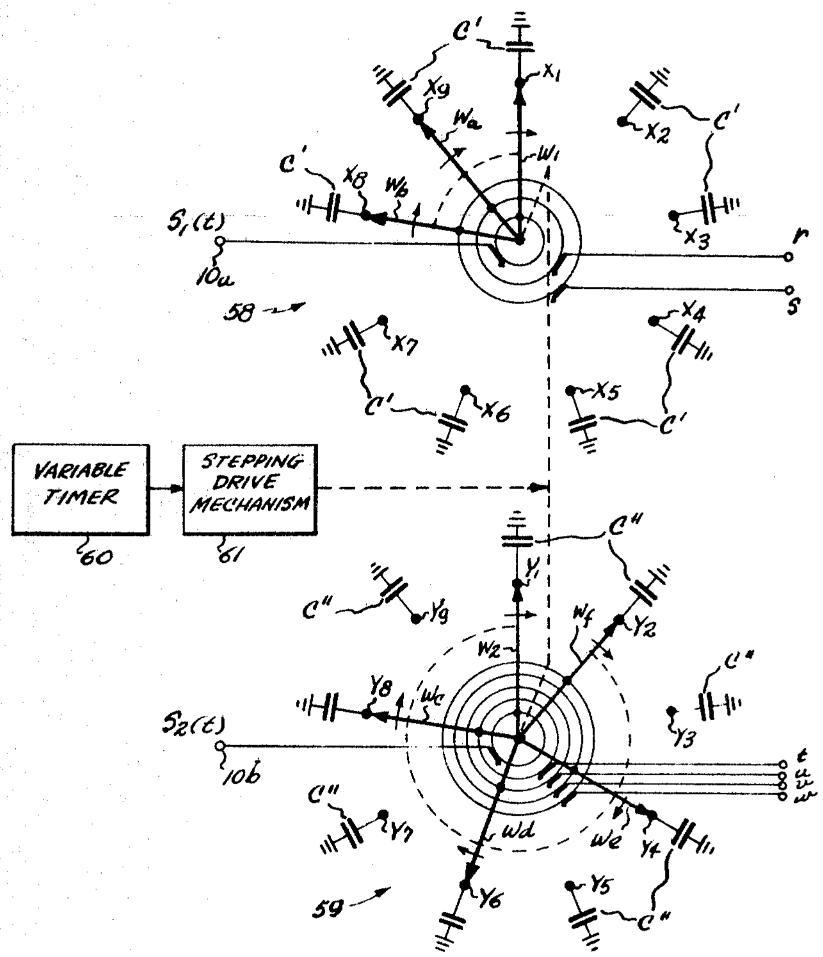
FIG. 4 is a schematic diagram of sampling means for low frequency signals.

The sampling means functionally illustrated in FIG. 4 for low-frequency signals comprises two stepping switches 58 and 59, having ganged sets of wipers W and each having nine contacts. Contacts $X_1$ to $X_9$ of stepping switch 58 are connected to individual signal sample storage condenser *c'*, and the contacts $Y_1$ to $Y_9$ of switch 59 are individually connected to storage condenser C''. Switch 58 has a condenser charging wiper $W_1$ and condenser voltage sampling wipers $W_a$ and $W_b$ ganged therewith in respective positions angularly offset from wiper $W_1$ by one- and two-contact intervals. Input signal $S_1(t)$ is applied to wiper $W_1$ through appropriate connections to input terminal 10*a*.

Similarly, switch 59 has a condenser charging wiper $W_2$, electrically connected to receive input signal $S_2(t)$ applied at input 10*b*, and four condenser voltage sampling wipers $W_c$, $W_d$, $W_e$ and $W_f$ ganged to wiper $W_2$ in respective positions angularly offset therefrom at two-, four-, six- and eight-contact intervals. The wipers of both switches are rotated clockwise in stepwise fashion by stepping mechanism 61 actuated periodically by a timer 60. Intervals between successive samplings and increments ($\tau$) between correlation coefficients are determined by the stepping period of the switch, which may be varied by timer 60. A typical range of variation is from 0.025 second to 10.0 seconds.

Figure 5:
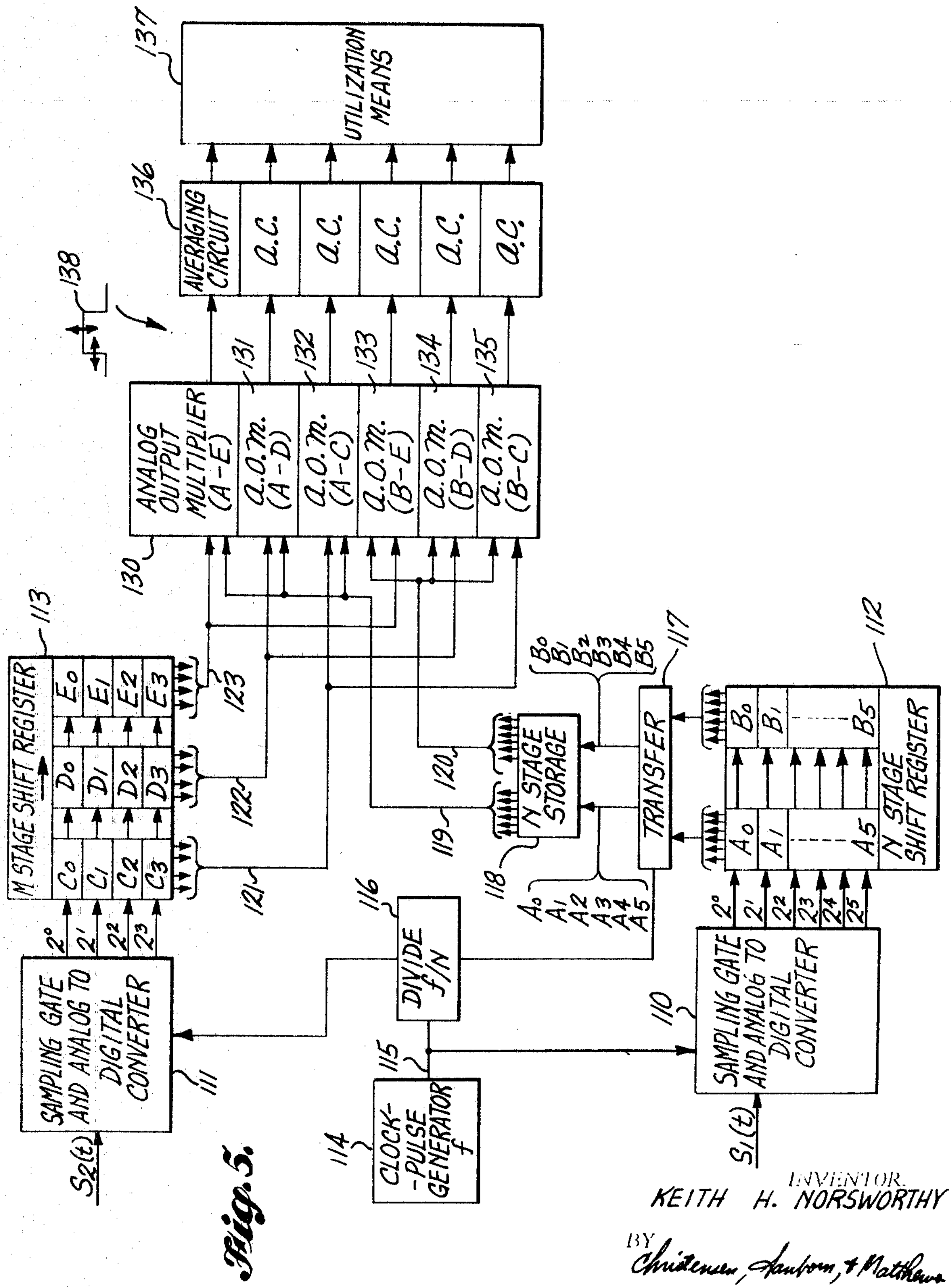
FIG. 5 is a block diagram of a digital embodiment of the present invention.

Storage condensers C' and C'' function in the same manner as output condensers C (FIG. 2) in the diode sampling gates in the first embodiment. When input signals $S_1(t)$ and $S_2(t)$ are here applied to a pair of condensers C' and C'', that is, when charging wipers $W_1$ and $W_2$ are positioned on a pair of X–Y contacts during intervals between switching movements, the condenser voltages "follow" the input signal voltages until the wipers are stepped to the next set of X–Y contacts. When this occurs the two charged condensers remain charged to voltages corresponding to the respective input signal values at the instant of switching. The resulting "sample" voltages are maintained on the respective condensers and used intermittently thereafter until a complete rotation of the switches takes place and the samples on such a pair are replaced by application of new samples. Succeeding condensers clockwise around each stepping switch receive successively timed signal samples in this manner, quency higher than the frequency of the control signal applied to the sampling gate. Thus the digitized sample is available at the output of each gate and converter unit immediately following sampling of the signal. In the embodiment of FIG. 5 the signal $S_1$ is sampled at a rate corresponding to the frequency $f$ of the clock pulse generator. A count-down or dividing circuit 116 operates to divide the frequency $f$ by the number of stages in the shift register 112, N. The output of the divider 116 is applied to the sample gate of unit 111 so that the second input signal $S_2$ is sampled at a rate equal to $f/N$ and the contents of register 213 are shifted at a rate of $f/N$. The divider 116 also controls a transfer circuit 117 which is disposed between the shift register 112 and a temporary storage unit 118 having N stages therein with each stage capable of storing a word having the same number of bits as the number of bits in each word in the shift register 112. On each $N^{th}$ clock pulse the contents of the shift register 112 are transferred in parallel to the storage unit 118. The output circuits 119 and 120 of the storage unit 118 are each paired with each of the output circuits 121, 122, and 123 of the shift register 113. Each pair of circuits will be seen to be connected to one of the multiplying circuits 130–135. The multiplying circuits are indicated as being of the analog output type with each having its output circuit coupled with an associated averaging circuit 136. Each averaging circuit 136 has its output coupled with the utilization means 137. As described in greater detail hereinafter, the circuits 130–135 in one embodiment serve to provide rectangular output pulses 138 which are pulse width-pulse height modulated in accordance with the binary values of the two input signals applied to the multiplier circuit.

Figure 7:
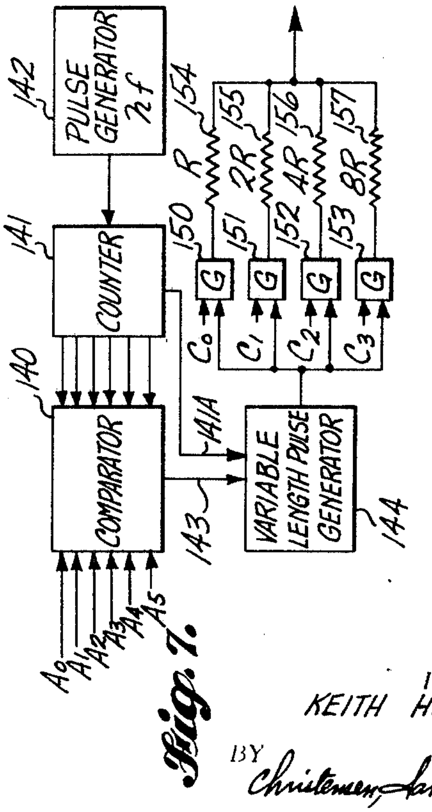

From the above and by referring to FIG. 7 it will be seen that the signal $S_1$ is digitized at the frequency of the clock pulse generator with the digitized information being applied to the shift register 112 and shifted in parallel therein at the frequency of the clock pulse generator. On each $N^{th}$ clock pulse the contents of the shift register 112 are transferred to the storage unit 118. Also on each $N^{th}$ clock pulse the signal $S_2$ is sampled and the contents of the shift register 113 advanced to the right by one stage. Thus the multiplying means 130–135 provide $M \times N$ products where M and N are the number of words in the shift registers 113 and 112. The delay value related to each multiplier output is fixed, and in the embodiment of FIG. 7 the individual delays take on the values $0, \Delta\tau$, $2\Delta\tau$, $3\Delta\tau$—$(MN-1)\Delta\tau$, where is the reciprocal of the clock frequency $f$. The sample product rate an any multiplier output channel is equal to the clock frequency divided by N, or $f/N$. Thus the sample product rate in the system of FIG. 5 is greater than the reciprocal of the maximum delay value $(MN-1)\Delta\tau$ as long as M is greater than unity.

From the above it will be seen that the product of two digital words must be formed in each channel and thus individual multiplier circuits 130–135 are provided. While various number systems can be used in accordance with the generic concepts of the invention, the binary system has many advantages in view of the availability of standard components which can be used in the shift registers, storage unit, divider and converters. While straightforward binary multiplication could be utilized it is to be noted that in the correlator system of FIG. 5 it is the average value of the sample products which is desired and, accordingly, true digital output signals are not necessary. Thus it is possible to make use of novel multiplication techniques for providing the desired output signals and thereby conserve on the components which would normally be required if one were to obtain true binary products and then go through a binary to analog conversion for each order in the binary product.

Figure 6:
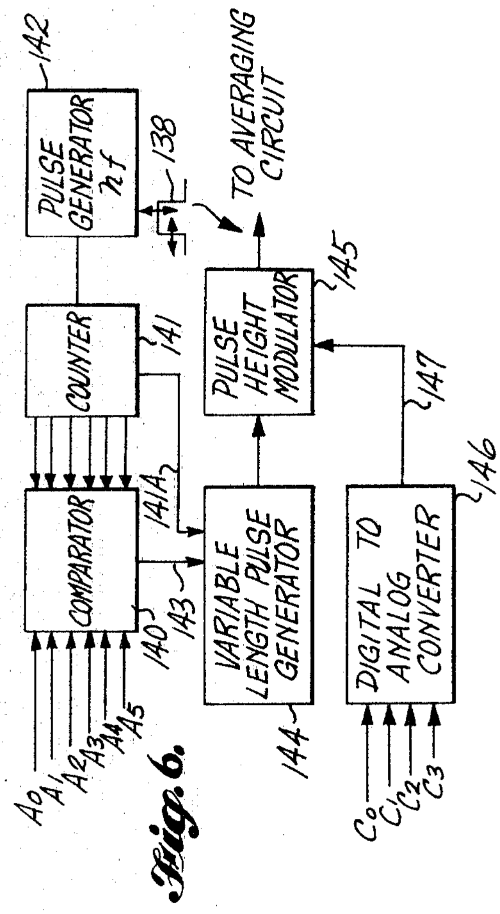

Referring now to FIG. 6 there is shown in block diagram form one type of multiplier 130 which is advantageously used for each multiplier unit in the system of FIG. 5. In the system of FIG. 5 it will be seen that each word in register 112 (and storage unit 118) is composed of six binary bits and that each word in register 113 is composed of four binary bits. Thus in FIG. 6 the six binary signals, identified as $A_0$—$A_5$ of the output circuit 119 are applied to a parallel comparator 140. The comparator 140 also receives six level binary information from the binary counter 141 which is repeatedly cycled from zero through $(2^6-1)$ by pulses received from the pulse generator 142. The pulse generator 142 operates at a frequency $nf$ which is sufficiently high to permit complete cycling of the counter 141 between each shift of register 113. When the contents of the counter 141 are equal to the binary value of the A stage of the storage unit 118 a signal is provided on stop circuit 143 to stop a variable length pulse generator 144 which is started in operation by a start signal on start circuit 141A when the first pulse is applied to the counter 141. Thus the pulse generator 141 is operated in a manner such that a pulse is applied therefrom to the pulse height modulator 145 with the length of such pulse being proportional to the binary value of the A stage of the storage unit 118. At the same time the four bits from the C stage of the shift register 113 are applied to a conventional digital-to-analog converter 146 having its output circuit 147 coupled for control of the pulse height modulator 145. The result is a rectangular pulse 138 having a width corresponding to the binary value of the A stage of the storage unit 118 and an amplitude proportional to the value of the C stage of the shift register 113. Thus it will be seen that the multiplying circuit receives binary input signals and provides an output pulse having an area proportional to the product $A \times C$. Accordingly, the multiplier circuit 130 is referred to as an analog output multiplier.

While the multiplier circuit arrangement of FIG. 6 is found to work well it does require a height modulation circuit 145 whch works linearly and drift free over the complete analog range of the digital-to-analog converter. Thus the multiplication system of FIG. 7 has been devised in order to eliminate such a height modulation circuit. Referring now to FIG. 7 it will be seen that the various components 140–144 of the system in FIG. 6 are utilized. In the system of FIG. 7 the variable length pulse from the generator 144 is applied simultaneously to each of the four binary "AND" gates 150–153. The second input for each of the gates 150–153 is respectively one of the binary value $C_0$–$C_3$ corresponding to one of the four bits of the "C" word in the C stage of shift register 113. Output signals from the gates 150–153 are combined by means of binary weighted resistors 154–157 so that an output signal proportional to the product $A \times C$ is provided to the averaging cir-150–153 applies zero voltage (or a reference voltage $V_0$) to the resistor associated therewith when the gate is "closed." When the gate is "open" it passes a voltage which is a function of the state of the binary bit preceding it. Thus if the input $C_0$ to gate 150 is "0" the gate 150 passes zero voltage (or a reference voltage $V_0$) whereas if the input $C_0$ is "1" the gate passes a different reference voltage $V_1$. The binary input signals $C_0$–$C_3$ therefore serve to "open" the associated gate when the input is a "1" so that the reference voltage $V_1$ is applied to the weighting resistor for a length of time determined by the length of the pulse from the variable pulse generator 144. Correlation coefficient outputs could be derived by placing an averaging capacitor between the resistor summation terminals and ground or by feeding the summation terminal to an integrator.

Figure 8:
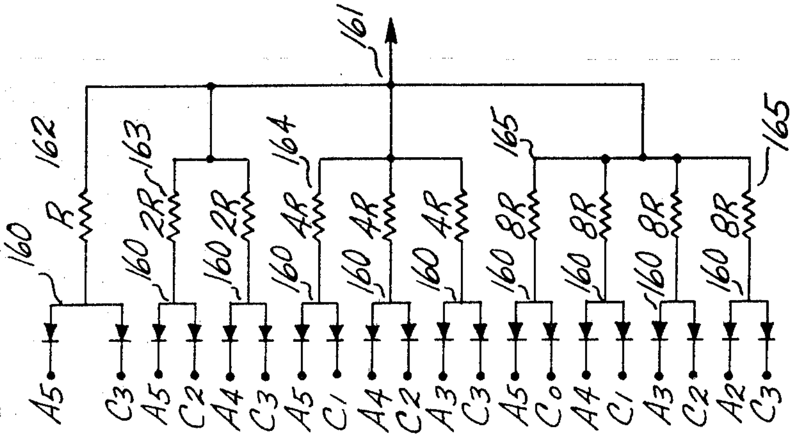
FIGS. 6, 7, and 8 are improved multiplying arrangements having particular advantage in the present systems and, FIG. 9 is a block diagram of another form of digital system for providing increased product rates.

In FIG. 8 a circuit arrangement is illustrated for providing the required digital multiplication in a simplified manner by first combining the individual words digitally and then producing an analog output by means of a digital-to-analog conversion. As previously noted, the so that samples stored are of increasing "age" progressing counterclockwise around the switches.

Voltage sampling wipers $W_a$, $W_b$, $W_c$, $W_d$, $W_e$ and $W_f$ are electrically connected to apply the stored samples to respective inputs *r, s, t, u, v* and *w* of multiplier 30 to be paired thereby into a full array of products corresponding to different time delays $\tau$ as before. The following table shows the sequence by which different X–Y contacts and corresponding storage condensers are paired in the illustrated case during stepping switch operation to establish a uniform array of eight delay times through nine consecutive cycles:

TABLE III

| | Time Delay $\tau$ | | | | | | | |
|---|---|---|---|---|---|---|---|---|
| | 0 | 1 | 2 | 3 | 4 | 5 | 6 | 7 |
| | Sampling Wiper Pair | | | | | | | |
| | $W_bW_c$ | $W_a$–$W_c$ | $W_b$–$W_d$ | $W_a$–$W_d$ | $W_b$–$W_e$ | $W_a$–$W_e$ | $W_b$–$W_f$ | $W_a$–$W_f$ |
| Cycle Number: | | | | | | | | |
| 1 | $X_8$–$Y_8$ | $X_9$–$Y_8$ | $X_8$–$Y_6$ | $X_9$–$Y_6$ | $X_8$–$Y_4$ | $X_9$–$Y_4$ | $X_8$–$Y_2$ | $X_9$–$Y_2$ |
| 2 | $X_9$–$Y_9$ | $X_1$–$Y_9$ | $X_9$–$Y_7$ | $X_1$–$Y_7$ | $X_9$–$Y_5$ | $X_1$–$Y_5$ | $X_9$–$Y_3$ | $X_1$–$Y_3$ |
| 3 | $X_1$–$Y_1$ | $X_2$–$Y_1$ | $X_1$–$Y_8$ | $X_2$–$Y_8$ | $X_1$–$Y_6$ | $X_2$–$Y_6$ | $X_1$–$Y_4$ | $X_2$–$Y_4$ |
| 4 | $X_2$–$Y_2$ | $X_3$–$U_2$ | $X_2$–$Y_9$ | $X_3$–$Y_9$ | $X_2$–$Y_7$ | $X_3$–$Y_7$ | $X_2$–$Y_5$ | $X_3$–$Y_5$ |
| 5 | $X_3$–$Y_3$ | $X_4$–$Y_3$ | $X_3$–$Y_1$ | $X_4$–$Y_1$ | $X_3$–$Y_8$ | $X_4$–$Y_8$ | $X_3$–$Y_6$ | $X_4$–$Y_6$ |
| 6 | $X_4$–$Y_4$ | $X_5$–$Y_4$ | $X_4$–$Y_2$ | $X_5$–$Y_2$ | $X_4$–$Y_9$ | $X_5$–$Y_9$ | $X_4$–$Y_7$ | $X_5$–$Y_7$ |
| 7 | $X_5$–$Y_5$ | $X_6$–$Y_5$ | $X_5$–$Y_3$ | $X_6$–$Y_3$ | $X_5$–$Y_1$ | $X_6$–$Y_1$ | $X_5$–$Y_8$ | $X_6$–$Y_8$ |
| 8 | $X_6$–$Y_6$ | $X_7$–$Y_6$ | $X_6$–$Y_4$ | $X_7$–$Y_4$ | $X_6$–$Y_2$ | $X_7$–$Y_2$ | $X_6$–$Y_9$ | $X_7$–$Y_9$ |
| 9 | $X_7$–$Y_7$ | $X_8$–$Y_7$ | $X_7$–$Y_5$ | $X_8$–$Y_5$ | $X_7$–$Y_3$ | $X_8$–$Y_3$ | $X_7$–$Y_1$ | $X_8$–$Y_1$ |

The second row in Table III represents the sampling wiper pairs formed by virtue of wiper connections to the multiplier inputs and further by virtue of appropriate cross-multiplication connections in the multiplier 30 (FIG. 1) itself. Each succeeding row illustrates for succeeding cycles corresponding pairing of respective X–Y contacts by virtue of the above-mentioned connections and the respective wiper positions on the contacts. Each column in the table illustrates successive pairings of different contacts (and corresponding sampling condensers) to produce successive products contributing to the resulting correlation coefficient for a particular time delay $\tau$. Comparison of Table III with FIG. 4 shows that a complete set of six samples applied to the multiplier during each cycle produces eight sample pairs (products) in each cycle, that each of the stored samples is used in different parts of the correlator circuit in different cycles following its inception and until replaced by a new sample nine cycles later, and that each operation cycle produces multiplication of samples stored over the previous eight cycles. The resulting products are applied to respective averaging circuits 41 to contribute to respective correlation coefficient outputs as before.

As indicated previously, variations in lengths of time delays are made possible in this embodiment by varying the period between stepping movements of switches 58 and 59. More time delays $\tau$ may be established by provision of additional contacts, storage condensers and wipers, or their equivalents, a small number having been chosen herein for simplicity of illustration only. The concept disclosed is of course not limited to use of stepping switches provided with storage condensers. Other functionally similar devices may be used, such as stepping motors, relays, electronic switches, memory circuits or combinations of these.

When measuring correlation functions by sampling techniques, the stability (accuracy) of the measurement is related to the number of samples or sample pairs received by each output channel during the integrating time of the output averaging filters. When high-frequency signals are analyzed, increments ($\Delta\tau$) between time delays can be chosen small and the sampling rate in each channel is sufficiently high for, say, several hundred samples to occur in a time equal to the averaging circuit time constant. Output stability is then good. However, when analyzing low-frequency signals delay increments ($\Delta\tau$) cannot be chosen small, the sampling rate normally is proportionally reduced, and accuracy decreases. The present embodiment, wherein time delays for the product pairs are established by pairing samples stored different lengths of time over previous cycles, greatly increases the possible number of product pairs available for presentation to each output channel per averaging circuit time constant, over that previously possible in analyzing low frequency signals.

The simultaneous availability of many correlation coefficients at the output of the correlator makes possible the direct computation of power spectra therefrom. When used with some power spectrum computing devices it is advantageous if the multichannel correlator system described thus far in FIG. 1 has the capability of inverting the input to certain channels of the correlator itself. In the embodiment illustrated in FIG. 1 this procedure is implemented by a switch 82 selectively operable to interpose a single inverter 80 in the signal ($S_2(t)$) inputs of the two sampling gates 21 and 22. So that both inverted and uninverted values of the correlation coefficients $\phi(\tau_n)$ will be available in all output channels of the correlator, switches 84 in the switching circuit leads for gates 23 and 24 are ganged with inverter switch 82 and are operable therewith to connect these two leads respectively to those for sampling gates 21 and 22.

With reference to the timing diagram (FIG. 3*a*) this changes the relative timing of the last two sampling gates 23 and 24 in the series to sample at times *e''* and *f''* as illustrated by dot-dash lines. This necessarily reduces in half the number of available time delay increments ($\Delta\tau$) inasmuch as there are now but two samples of signal $S_2(t)$ available for multiplication with samples of signal $S_1(t)$. However, these two samples are duplicated in positive and negative "polarity" (i.e. uninverted and inverted) and result in corresponding duplicate pairs of correlation coefficients, inverted and uninverted, for the same time delays $\tau$. In actual practice a large amount of timing circuitry will be affected by this input inversion technique for producing inverted correlation coefficients, so that it is normally preferred to invert the signal input involving the fewer number of input (sampling) circuits.

In the embodiment of the invention illustrated in FIG. 5 the input signals $S_1$ and $S_2$ are respectively applied to the sampling gate and analog-to-digital converters units 110 and 111 which periodically sample and digitize the input signals. The resulting digital values (words) are applied to associated noncycling shift registers 112 and 113. Shift register 112 is indicated as having N stages, or the capacity for receiving and shifting therein N words, while shift register 113 is indicated as being an M stage shift register. In the specific embodiment of FIG. 7 the shift register 112 is shown as having two stages, or word storage sections, each word being of six binary bits. The shift register 113 is shown as having three stages of four bits each. The number of bits per word in the two registers have been shown as being six and four, respectively, for purposes of teaching the present invention.

A clock pulse generator 114 operating a frequency *f* has its signal output circuit 115, connected directly with the first gate analog-to-digital converter unit 110. The unit 110 and 111 preferably each include a sampling gate of the type shown in FIG. 2 followed by a conventional analog-to-digital converter which is operated at a frecorrelation systems of the present invention are directed toward obtaining an average value of the sampled products which corresponds to an average of the signal products. Thus it is not necessary to obtain instantaneous product values. The multiplication system of FIG. 8 is of particular value in such systems since it serves to define a product term with low resolution and yet a good estimate of mean value is obtained. In the system shown in FIG. 5 the words in the shift register 113 are defined in terms of four binary bits and words in the shift register 112 and in the storage unit 118 are defined by six binary bits. Thus if one considers the "A" and "C" word in the registers 112 and 113 to be:

$$A=A_0(2^\circ)+A_1(2^1)+A_2(2^2)+A_3(2^3)+A_4(2^4)+A_5(2^5)$$

$$C=C_0(2^0)+C_1(2^1)+C_2(2^2)+C_3(2^3)$$

where $A_0$, $A_1$ . . . $A_5$ and $C_0$ . . . $C_3$ take on values of 0 or 1, the product $A \times C$ can be broken into a number of components and a weight assigned to each as follows:

| | Max wt. |
|---|---|
| $2^8$ $(A_5C_3)$ | 1 |
| $2^7$ $(A_5C_2+A_4C_3)$ | 1 |
| $2^6$ $(A_5C_1+A_4C_2+A_3C_3)$ | 3/4 |
| $2^5$ $(A_5C_0+A_4C_1+A_3C_2+A_2C_3)$ | 4/8 |
| $2^4$ $(A_4C_0+A_3C_1+A_2C_2+A_3C_1)$ | 4/16 |
| $2^3$ $(A_3C_0+A_2C_1+A_1C_2+A_0C_3)$ | 4/32 |
| $2^2$ $(A_2C_0+A_1C_1+A_0C_2)$ | 3/64 |
| $2^1$ $(A_1C_0+A_0C_1)$ | 2/128 |
| $2^0$ $(A_0C_0)$ | 1/256 |

where each product, such as $A_5C_2$, is unity if both $A_5$ and $C_2$ are "1" and zero if not.

In the example given the product term may be sufficiently defined if only the first four components in the above chart are accounted for. These product terms are readily obtained through the use of simple diode "AND" gates and weighting resistors. Thus it will be seen in FIG. 8 that a number of diode "AND" gates 160 are arranged for receipt of the various binary bits from the two words to be multiplied with the outputs of each individual "AND" gate being applied through the indicated resistor networks to a common summing junction 161 for application to an averaging circuit 136. It will be seen that the values corresponding to $2^8$ have the greatest weight by being applied to the summing junction 161 through a resistor 162 having a resistance "R," the $2^7$ components are summed by a pair of resistors 163 each having a value of 2R, the $2^6$ values are summed through the resistors 164 each having a resistance of 4R, and the $2^5$ values are summed through the resistors 165 each having a value of 8R. In a given application it may be necessary to extend the general concept illustrated in FIG. 10 by additional binary orders, but in general it will be seen from the above chart of relative weights to be accorded to the various binary values that even a four binary stage combining network covering the values from $2^8$ through $2^5$ leads to sufficient accuracy for many applications.

When the teachings of the present invention are implemented by a system such as that shown in FIG. 5 making use of shift registers, the sample product rate is given by the reciprocal of the quantity $(n\Delta\tau)$ where N is the number of words in the shift register 112 (and also the number of words in the storage unit 118). In many applications $\Delta\tau$ is fixed by the requirements of the system and accordingly it will be seen that the product rate is maximized when N equals unity. In that case the system then becomes one having a "$1 \times M$" delay pattern capability rather than a Cartesian "$N \times M$" delay pattern. In such applications where $\Delta\tau$ must remain fixed it is often desirable to obtain a product rate even greater than that obtained by having N equal to unity in a system such as that of FIG. 5. The system shown in FIG. 9 makes possible the achievement of such higher product rates.

Figure 9:
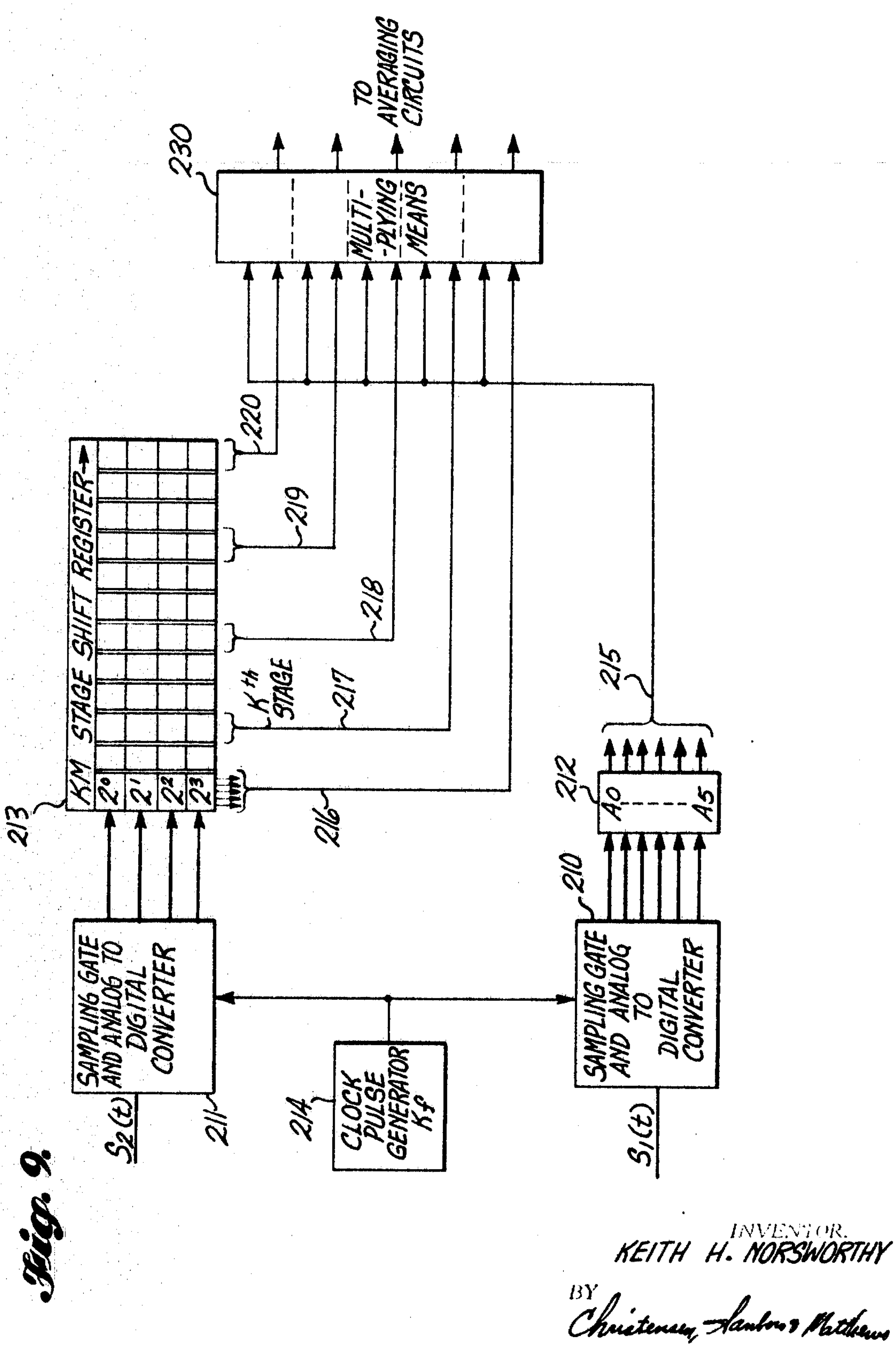

In the system of FIG. 9 the input signals $S_1$ and $S_2$ are respectively applied to the sampling gate and analog-to-digital converter units 210 and 211 which are similar to the units 110 and 111 in FIG. 5. However in the system of FIG. 9 these units serve to sample both of the input signals at the rate of the occurrence of pulses from the clock pulse generator 214. The digitized signals from the unit 210 are applied to a single word storage unit 212 (which can also be referred to as a single stage shift register) and the digitized signals from the converter 211 are applied to the stage shift register 213. To provide a comparison to the system of FIG. 5 the clock pulse generator 214 is shown as operating at a frequency of K times the frequency $f$ of FIG. 5 and only each $K^{th}$ stage of the register 213 has an output circuit. In the specific example it is assumed that the frequency of the clock pulse generator is 3 times that of the frequency of the clock pulse generator in the system of FIG. 5 and accordingly every third stage of the shift register 213 has its signal output circuit paired with the output circuit 215 of the single stage register 212.

It will be seen that in the system of FIG. 9 the input signals are sampled at the rate $Kf$ of clock pulse generator 214, and that the product rate is also $Kf$. Since only every $K^{th}$ stage of shift register 213 provides output signals $\Delta\tau$ remains at the desired constant value. It will therefore be seen that the system of FIG. 9 provides a convenient method of obtaining an increased product rate even though $\Delta\tau$ must remain fixed for a given application. Even though the number of stages in the register 213 must be increased by a factor of K it should be noted that since only every $K^{th}$ stage must be capable of providing output signals the intermediate stages can be low cost magnetic shift register stages.

While the systems have been illustrated as using storage capacitors with wiper switches, or as using shift registers, it should be noted that addressable digital memories such as magnetic cores or magnetic drums could be used. For example a core memory could readily be used with the digital words corresponding to signal samples being entered into the core memory by sequentially increasing the "write address" registers. Several "read addresses" would be selected in parallel with their addresses sequencing around at an appropriate fixed number of increments behind the write addresses. The words read out of the memory would enter registers such as flip-flops connected to the multiplying means.

While the invention has been disclosed by reference to presently preferred embodiments, it should be understood that those modifications which become obvious to a person skilled in the art, as a result of the teachings hereof are to be encompassed by the following claims.

What is claimed is:

1. A system for computing a correlation function of electrical signals appearing at first and second circuit conductors comprising: signal input means connected to said conductors and providing first and second pluralities of time-related time successions of signal values at said first and second conductors, multiplication circuit means connected to said input means and recurringly cross multiplying each of the plurality of time-related time successions of signal values at the first conductor by each of the plurality of time-related time successions of signal values at the second conductor, the latter time successions of values bearing a predetermined time relationship to the former, to produce recurring sets of circuit responses representing recurringly the Cartesian product of the cross-multiplied signal values, and signal averaging means coupled with said multiplication means for separately time averaging the respective recurring circuit responses substantially continuously to represent respective correlation coefficients collectively defining said correlation function.

2. Correlation computer apparatus comprising first and second signal inputs, first and second groups of signal sampling devices to which the inputs are respectively applied, timing means operable through recurring cycles and connected to the sampling devices to operate those in the first group at successively delayed times and those in the second group at successively delayed times in timed relation with the sampling times of the first group, each such device having a storage element therein which tracks the successive sample values of signal and which, between sampling times, retains the signal sample therein, means forming a plurality of output channels each with two inputs operatively associated respectively with sampling device storage elements of the first and second groups, whereby said output channels receive respectively different combinations of two signal samples including one from each sampling device group, means in each output channel for multiplying the recurringly received signal samples, and separate means coupled with each output channel for averaging recurring products therein to derive respective correlation coefficient outputs.

3. The computer apparatus defined in claim 2, wherein the output channel inputs operatively associated with the sampling device storage elements in the first group comprise means operated cyclically by the timing means to generate in each such latter input recurring pulses each having an amplitude-duration pulse envelope product proportional to the currently stored signal sample in the associated sampling device, and wherein the inputs of all output channels comprise pulse modulators receiving such pulses and operable to vary the amplitude-duration products thereof in proportion to the stored signal samples in signal sampling devices of the second group associated with such inputs, thereby to multiply together the recurringly received signal samples operatively associated with each output channel, and means in each output channel responsive to the modulated pulses to produce an output response proportional to the time average of varying amplitude-duration recurrent products.

4. The computer apparatus defined in claim 3, wherein the first-mentioned pulse generator comprises in each channel a triggerable variable-length pulse generator having a starting trigger input and a stopping trigger input, means for applying the stopping trigger simultaneously to corresponding inputs of such pulse generators in response to operation of the timing means, a sawtooth wave generator cyclically triggered by said timing means, amplitude comparison circuits having outputs connected to the respective starting trigger inputs and each having a first input connected to the sawtooth wave generator and a second input connected to the respectively associated sampling device storage element, said comparison circuits further including means for adding said first and second inputs, means for comparing the sum of said inputs to a reference circuit value, and means operable to produce an output trigger pulse in response to amplitude coincidence between the instantaneous input sum and said reference value.

5. A system for computing the correlation function of a pair of input signals, comprising a first input means to which one signal is applied, a second input means to which the other signal is applied, each of said input means having a plurality of outputs and being operable to produce in said outputs representations of the applied input signal bearing a predetermined set of successively delayed relationships to one another, the signal representations from one input means also bearing predetermined time relationships with the signal representations from the other input means; multiplying circuit means having a plurality of inputs; circuit means operatively associated with said input means and with said multiplying circuit means and operable to apply said signal representations to said multiplying circuit means in pairs of one signal representation from each of said input means with the signal representations in each pair bearing to each other a time-delay relationship differing from time-delay relationships of signal representatons comprising all other pairs, said multiplying means having a plurality of output channels each responsive to a different one of said pairs of signal representations and being operable to produce in said output channels respective output responses each representative of the product of the amplitudes of the pair of applied signal representations whereby each signal representation from the first input means is multiplied by each signal representation from the second input means, and separate means operatively associated with each multiplying means output channel for continuously averaging the output responses therein.

6. The system defined in claim 5 wherein each delay means comprises a set of sampling devices and cyclically operable timing control means actuating said devices at successively delayed times to derive successive sample values of the applied input signal as said output signal representations.

7. The system defined in claim 6 wherein said timing control means is operable to actuate the sampling devices of each set in successive order during each cycle and is connected to said multiplying means to operate the same cyclically for multiplying said pairs of signal sample representations derived during each such cycle.

8. The system defined in claim 7, wherein the timing control means is operable to actuate the sampling devices for the first signal at equal intervals and those sampling the second signal at intervals of a length equal to the product of the interval between samplings of the first signal multiplied by the number of samples taken of said first signal in each cycle, thereby to establish a uniform array of equal time-delay differentials between pairs of signal sample representations.

9. The system defined in claim 6 wherein at least one such set of sampling devices comprises a set of storage elements and storing means sequentially cooperable therewith to derive a single signal sample during each cycle in successive storage elements, wherein said multiplying means includes a plurality of separate multiplier units each adapted to receive a different pair of signals from said delay means, and sample selection means cyclically operable in synchronous relationship with said storing means to apply to said multiplying means in each cycle a plurality of stored samples which bear the same storage time relationship to each other as the plurality of samples applied in each preceding cycle and wherein each said stored sample is applied to a different multiplier unit.

10. The system defined in claim 9 wherein said storing means includes a series of terminals electrically connected respectively to the individual storage elements, first switching means connected to receive said applied input signal and operable to engage said terminals sequentially, second and third switching means comprising said sample selection means and being also operable to engage said terminals sequentially, said second and third switching means being respectively connected to first and second outputs to which said multiplying means is responsive, and actuating means connected to said first switching means to engage and disengage the same with successive terminals in step-by-step manner whereby to derive successive signal samples in the respective storage elements, said actuating means being similarly connected to the second and third switching means to engage and disengage the second and third switching means with the respective terminals a predetermined whole number of steps after engagement therewith of the first switching means, and to engage and disengage the third switching means with the respective terminals a predetermined whole number of steps after the second switching means, thereby to apply the stored samples successively to each of said first and second outputs, said second delays means comprising a second set of storage elements and second storing means having a series of terminals electrically connected respectively to the individual storage elements in said second set, said storing means further including a fourth switching means connected to receive the applied input signal and operable to engage said terminals sequentially, and fifth and sixth switching means also operable to engage said terminals sequentially and respectively connected to third and fourth outputs to which said multiplying means is responsive, said actuating means being similarly operatively connected to the fifth and sixth switching means to engage and disengage the fifth with the respective terminals a predetermined whole number of steps after the fourth, and to engage and disengage the sixth with the respective terminals a predetermined whole number of steps behind the fifth, thereby to apply successively to each of said third and fourth outputs the samples stored in the second set of storage elements, the interval between said fifth and sixth switch-elements being an integral multiple of the interval between the second and third switching elements.

11. In correlation computer apparatus having first and second signal inputs, a first series of storage condensers, a first switch means including a series of terminals connected respectively to the individual condensers and including first, second and third switching elements operable to engage said terminals sequentially, said first switching element being connected to the first signal input, first and second outputs to which the second and third switching elements are respectively connected, actuating means connected to said first switching element to operate the same in step-by-step manner through recurring cycles, thereby to store in the respective condensers successive samples of voltage in the first signal input during each cycle, said actuating means being similarly operatively connected to said second and third switching elements, with the second switching element engaging the respective terminals a predetermined whole number of steps after the first switching element and with the third switching element engaging such terminals a predetermined whole number of steps after the second element, thereby to apply the stored samples successively to each of said first and second outputs, a second series of storage condensers, a second switch means including a series of terminals connected respectively to the individual condensers in the second series and including fourth, fifth and sixth switching elements operable to engage said last-mentioned terminals sequentially, said fourth switching element being connected to said second signal input, third and fourth outputs to which the fifth and sixth switching elements are respectively connected, said actuating means being similarly operatively connected to said fourth, fifth and sixth switching elements, with the fifth switching element engaging the respective terminals a predetermined whole number of steps after the fourth and with the sixth engaging such terminals a predetermined whole number of steps behind the fifth thereby to apply successively to each of said third and fourth outputs the second input voltage samples stored in the second-series condensers by the fourth switching element, the interval between said fifth and sixth switching elements being an integral multiple of the interval between the second and third switching elements.

12. In correlation computer apparatus having first and second signal inputs, means for establishing time-delay differentials between signal values for multiplication, comprising in combination: a first series of storage condensers, a first switch means including a series of terminals connected respectively to the individual condensers and including a plurality of switching elements 1, 2, 3 . . . *p*, operable to engage said terminals sequentially, the first switching element being connected to the first signal input, a first plurality of outputs to which switching elements 2, 3 . . . *p* are respectively connected, actuating means connected to switching element 1 to operate the same in step-by-step manner through recurring cycles, thereby to store in the respective condensers successive samples of voltage in the first signal input during each cycle, said actuating means being similarly operatively connected to said switching elements 2, 3 . . . *p*, with switching element 2 engaging the respective terminals a predetermined whole number of steps after switching element 1 and with each succeeding switching element engaging such terminals a predetermined whole number of steps after its predecessor, thereby to apply the stored samples successively to each of said first plurality of outputs, a second series of storage condensers, a second switch means including a series of terminals connected respectively to the individual condensers in the second series and including switching elements 1′, 2′, 3′ . . . *p′*, operable to engage said last-mentioned terminals sequentially, switching element 1′ being connected to said second signal input, a second plurality of outputs to which switching elements 2′, 3′ . . . *p′* are respectively connected, said actuating means being similarly operatively connected to switching elements 1′, 2′, 3′ . . . *p′*, with switching element 2′ engaging the respective terminals a predetermined whole number of steps after switching element 1′ and with each succeeding switching element engaging such terminals a predetermined whole number of steps after its predecessor, thereby to apply successively to each of said outputs in the second plurality the second input voltage samples stored in the second-series condensers by switching element 1′, the interval between successive switching elements 2′, 3′ . . . *p′* being equal to the product of *p* multiplied by the interval between successive switching elements 2, 3 . . . *p*.

13. A system for computing a correlation function of a pair of input signals, comprising separate means for deriving a set of samples of each input signal, with the individual samples of one set occurring in predetermined time-spaced relationship with individual samples of the other set, multiplying means having a plurality of outputs and operatively associated with said separate means and operable to multiply each individual sample in one set by each individual sample in the other set, thereby to produce a plurality of output product circuit responses in the respective outputs, means in such system for cyclically repeating such sampling and multiplying, whereby to produce such output product responses recurringly, and separate means operatively associated with the respective multiplying means outputs for continuously averaging the responses therein whereby to derive separate correlation coefficient outputs which collectively represent the correlation function of said input signals.

14. The system defined in claim 13, wherein said sample-deriving means comprises first and second sets of sampling devices to which the input signals are respectively applied, and wherein said means for cyclically repeating sampling and multiplying comprises timing control means operable cyclically to actuate said devices at successively delayed times during each cycle whereby to derive successive samples of the applied input signals and being further operable to actuate said multiplying means cyclically for multiplying the samples derived during each such cycle.

15. The system defined in claim 14, wherein the sampling devices comprise gate circuits each having a sample storage element therein operable to retain a signal sample value between successive operations thereof, and wherein said multiplying means outputs are responsive to respectively different combinations of two of such currently retained signal samples including one of each input signal.

16. The system defined in claim 15 wherein said multiplying means comprises a plurality of input circuits each responsive to one of the gate circuits in the first set to generate recurring pulses each having an amplitude-duration pulse envelope product proportional to the sample currently stored in such circuit, and a plurality of output circuits responsive to respectively different combinations of one of said input circuits and one of the gate circuits in the second set, each output circuit being operable to modulate the amplitude-duration product pulse in the associated input circuit in proportion to the sample currently stored in the associated gate circuit.

17. The system defined in claim 13 wherein at least one of said separate signal sample deriving means comprises a plurality of storage elements and storing means cooperable cyclically therewith to store the successively derived signal samples in said elements, and sample selection means cyclically operable in synchronous relationship with said storing means to apply to said multiplying means in each cycle a plurality of stored samples which bear the same time relationship to each other as the plurality of samples applied in each preceding cycle.

18. A system for computing a correlation function of a pair of input signals, comprising a separate means for successively sampling each input signal, with the individual samples of one input signal derived in time-spaced relationship with individual samples of the other input signal, circuit means forming pairs of such samples with each pair having one sample from each input signal and members of the respective pairs having different time relationships whereby to correspond to different predetermined amounts of time delay, said circuits means including means operable to multiply together substantially simultaneously the members of such sample pairs, thereby to produce respective output product responses corresponding to said predetermined amounts of time delay, means in such system for cyclically repeating such sampling, pairing and multiplying to produce respective series of such output product responses, and means operative through recurring cycles to average each such series individually.

19. A system for computing the correlation function of first and second input signals, comprising in combination: first signal input means to which the first input signal is applied having a plurality N of outputs and operable to produce in said outputs N simultaneous representations of the applied signal having equal time-delay differentials $\Delta\tau$ therebetween; second signal input means to which the second signal is applied having a plurality M of outputs and being operable to produce in its said outputs M simultaneous representations of the applied input signal having equal time-delay differentals $N\Delta\tau$ therebetween; multiplying means having a first plurality N of input circuits operatively associated with said first signal input means and operable to receive said first signal representations and a second plurality M of input circuits operatively associated with said second input means and operable to receive said second signal representations, said multiplying means having a plurality MN of output channels each providing an output signal representative of the product of a different pair of said input signal representations with each such pair including one input signal representation from each of said signal input means.

20. The system defined in claim 19 wherein said first signal input means comprises means for deriving samples of said first input signal, including first signal storage means having N storage locations for said samples; said second input means comprises means for deriving samples of said second input signal, including second signal storage means having M storage locations for said samples; and wherein said system further includes cyclically operable timing control means for actuating each of said sample deriving means at successively delayed times to store successive sample values of the applied input signal as said input signal representations.

21. The system defined in claim 20 wherein said timing control means includes means for actuating the first sample deriving means to store successive first signal samples separated by intervals $\Delta\tau$ and means for actuating the second sample deriving means to store second signal samples separated by time intervals $N\Delta\tau$.

22. The system defined in claim 20 wherein said first signal storage means comprises a first shift register having N stages.

23. The system defined in claim 22 wherein said second storage means comprises a second shift register having M stages.

24. The system defined in claim 19 wherein: said first signal input means includes a first signal sampling gate, an analog to digital converter unit and an N stage shift register; said second signal input means includes a second signal sampling gate, a second analog to digital converter, and an M stage shift register; said system further including cyclically operable timing control means coupled with said first and second signal input means causing said first input signal to be sampled periodically at a frequency $f$ and said second input signal to be sampled at a frequency of $f/N$, said first converter unit being coupled with said N stage shift register and operable to digitize samples of said first signal and apply the same sequentially to said N stage shift register, said second converter unit being coupled with said M stage shift register and operable to digitize samples of said second signal and apply the same sequentially to said M stage shift register.

25. The system defined in claim 24 including means applying N samples of said first signal derived from said N stage register and M samples of said second signal derived from said M stage register simultaneously to said multiplying means.

26. The system defined in claim 25 and including an N stage signal storage unit coupled with said N stage register and having N output circuits coupled with said multiplying means, and means including said timing control means for periodically transferring the contents of said N stage shift register into said N stage storage unit.

27. The system defined in claim 26 wherein the contents of said N stage shift register are transferred to said storage unit at a frequency of $f/N$.

28. The system defined in claim 24 wherein said multiplying means includes $M\times N$ analog output-digital input multiplication units.

29. The system defined in claim 21 wherein said input means include respective pluralities of N and M readout means coupled respectively with said N and M outputs and cooperable in synchronous relationship with the respective sample deriving means to apply to said multiplying means in each time interval $N/f$ respective pluralities of N and M stored samples of said signals bearing the same storage-time relationship to each other as the plurality of samples applied in each preceding cycle.

30. A signal sampling and multiplying system for a correlation computing apparatus comprising in combination: first signal sampling means including a first signal sampling gate adapted to sample a first signal periodically at time intervals $\Delta\tau$ apart; an N stage signal storage unit; first circuit means coupled with said first sampling means and with said storage unit adapted to apply N output signals representing N samples from said sampling means to said storage unit, said storage unit having N output circuits for providing simultaneously N output signals representing N signal samples; second signal sampling means including a second signal sampling gate adapted to sample a second signal periodically at time intervals $N\Delta\tau$ apart; a multistage signal storage unit having M stages; second circuit means coupled with said second sampling means and with said M stage storage unit adapted to fill said M stage storage unit with M signals representing M signal samples which are $N\Delta\tau$ time intervals apart; and a plurality of multiplication circuit means coupled with said M stage storage unit and with said N stage storage unit for simultaneously multiplying the signal in each stage of said N stage unit times a plurality of the stages in said M stage unit.

31. The system defined in claim 30 wherein said first circuit means includes an N stage shift register for receiving samples from said first sampling means sequentially and shifting the same therein, signal transfer means coupling each stage of said shift register with a stage of said N stage storage unit, and means operating said signal transfer means at time intervals $N\Delta\tau$ apart.

32. The system defined in claim 31 wherein said M stage storage unit is an M stage shift register.

33. The system defined in claim 30 wherein said first signal sampling means includes an analog to digital converter.

34. The system defined in claim 31 wherein each of said signal sampling means includes an analog to digital converter, wherein the signals stored in said storage units are digital signals representing the input signal samples, and wherein said multiplication circuit means include MN digital input-analog output multiplication units.

35. The system defined in claim 30 wherein said multiplication circuit means includes a number MN of simultaneously operable multiplication units each adapted to multiply a different pair of input signals with each said pair including one signal from one stage of said M stage storage unit and one signal from said N stage storage unit, to thereby provide MN products simultaneously.

36. The system defined in claim 31 wherein N equals one, and wherein only every $K^{th}$ stage of said M stage unit is coupled with said multiplication circuit means and wherein the output of said N stage unit is paired with each said Kth stage where K is a number greater than one.

37. The system defined in claim 30 wherein each of said signal sampling means includes an analog to digital converter, N equals one, said N stage storage unit comprises a single stage multibit register, said M stage storage unit comprises a multistage multibit shift register, and each $K^{th}$ stage of said M stage unit has a signal output circuit paired with the output circuit of said N stage unit as an input for said multiplication means, where K is a number greater than one.

38. The system defined in claim 37 wherein each stage of said M stage unit other than each said $K^{th}$ stage is a magnetic signal storage stage.

39. The system defined in claim 5 wherein the said first input means includes N outputs and means for establishing equal time-delay differentials $\Delta\tau$ between the signal representations in said N outputs, the second input means includes M outputs and means for establishing equal time-delay differentials $N\Delta\tau$ between the signal representations in said M outputs, and said multiplying circuit means includes a plurality of MN of said output channels providing output signals representative of respective products of signal representations corresponding to time-delay differentials separated by increments $\Delta\tau$.

40. A system for computing a correlation function of electrical signals appearing at first and second circuit conductors comprising: sampling means coupled with said conductors for selectively sampling the respective signals at the first and second conductors at time-related successive intervals, signal storage means coupled to said sampling means for storing such samples individually to represent said signal values, multiplication circuit means coupled with said storage means for cross multiplying each of the plurality of time-related time successions of signal values in the first storage means by each of the plurality of time-related time successions of signal values in the second storage means, the latter time successions of values bearing a predetermined time relationship to the former, to produce a set of circuit responses representing the Cartesian product of the cross-multiplied signal values, and signal averaging circuit means coupled with said multiplication circuit means for electrically time averaging the respective responses substantially continuously to represent respective correlation coefficients defining said correlation function.

References Cited

UNITED STATES PATENTS 2,908,889 10/1959 Piety.
3,217,289 11/1963 Elliott et al.

RODNEY D. BENNETT, JR., Primary Examiner

C. E. WANDS, Assistant Examiner